United States Patent
Hubbard

[19]

[11] Patent Number: 5,947,543
[45] Date of Patent: Sep. 7, 1999

[54] VEHICLE SAFETY SYSTEM

[76] Inventor: Leo James Hubbard, 29 Bridgetown Rd., Hilton Head Island, S.C. 29928

[21] Appl. No.: 08/833,040

[22] Filed: Apr. 3, 1997

[51] Int. Cl.⁶ .................................................... B60N 2/42
[52] U.S. Cl. .................................... 296/68.1; 296/216.18; 296/216.19
[58] Field of Search ...................... 296/68.1; 297/216.16, 297/216.18, 216.19, 216.1

[56] References Cited

U.S. PATENT DOCUMENTS

| | | | |
|---|---|---|---|
| 2,736,566 | 2/1956 | Hartl ........................................ | 296/68.1 |
| 3,832,000 | 8/1974 | McDonnell . | |
| 3,858,930 | 1/1975 | Calandra et al. ....................... | 296/68.1 |
| 3,992,046 | 11/1976 | Braess ..................................... | 296/68.1 |
| 5,125,472 | 6/1992 | Hara ........................................ | 180/271 |
| 5,167,421 | 12/1992 | Yunzhao ............................. | 296/68.1 X |
| 5,344,204 | 9/1994 | Yunzhao ................................ | 296/68.1 |
| 5,398,185 | 3/1995 | Omura .................................... | 180/268 |
| 5,413,378 | 5/1995 | Steffens, Jr. et al. ................... | 280/735 |
| 5,439,249 | 8/1995 | Steffens, Jr. et al. ................... | 280/735 |
| 5,573,269 | 11/1996 | Gentry et al. ........................... | 280/735 |

FOREIGN PATENT DOCUMENTS 94022692  10/1994  WIPO ............................... 297/216.18

Primary Examiner—Dennis H. Pedder
Attorney, Agent, or Firm—M. LuKacher; R. C. Brown

[57] ABSTRACT

An improved system for passenger safety in a front-end vehicle collision, whereby the kinetic energy of a passenger may be reduced before the passenger is exposed to the crash deceleration. An electrical sensor mounted at the extreme front end of the vehicle senses the onset of a front-end collision and sends a crash signal to the passenger compartment. Preferably, the sensor is a normally-closed momentum-activatable switch. A passenger seat is mounted on translating means permitting rearward motion and has a harness to secure a passenger to the seat. The seat is held in place by a shearable pin. Beneath the seat, attached between the floor of the vehicle and the frame of the seat, is a linear actuator powered by an explosive charge which is ignitable electrically in response to the crash signal. Upon firing of the actuator, a guillotine edge on the seat frame shears the pin, and the seat and passenger are thrust rapidly rearward so that the passenger is travelling rearward with respect to the vehicle and more slowly forward with respect to the ground. Thus, the kinetic energy of the passenger is reduced and the intensity of his deceleration from the crash pulse is minimized. The seat back and cushion may be hinged for rotation backwards on the seat frame. A second explosive actuator causes rotation about the hinge coincident with the rearward translation of the frame. Rotation of the seat can orient the passenger more favorably to withstand the remaining shock of the crash pulse.

21 Claims, 6 Drawing Sheets

VEHICLE SAFETY SYSTEM

DESCRIPTION

The present invention relates to apparatus for protecting seated passengers of vehicles during vehicle collisions, more particularly to apparatus for displacing the front seats of vehicles during vehicle collisions, and most particularly to apparatus for explosively displacing a seated passenger rearward with respect to the vehicle during a collision to reduce his forward velocity and kinetic energy with respect to the ground and to the vehicle after it becomes stationary.

In a front-end collision of a vehicle with another object such as another vehicle or an off-road hazard, the vehicle and its occupants may come to a very sudden stop from a relatively high speed, frequently becoming motionless in no more than a few feet and in a second or less of time. The initial collision of the vehicle with an object is known as the "primary" collision. A "secondary" collision is said to occur when an unsecured object, such as a passenger, continues forward under its own momentum, after the vehicle has begun to slow down or stop, and collides with a forward portion of the vehicle. It is the secondary collision which is hazardous to the health or lives of a vehicle's occupants because of very abrupt high decelerative forces imposed on passengers, frequently concentrated over a small portion of their anatomy. Decelerations exceeding 5 G (gravitational acceleration) are common.

The automotive industry has devoted enormous resources over many years to developing and implementing techniques and apparatus for reducing the occurrence of secondary collisions, and for minimizing the intensity of impact on humans when such collisions do occur. Thus, vehicles have long been provided with padded dashboards and steering wheels; and more recently with lap belts, shoulder belts, and instantly-inflatable airbags disposed within dashboards and steering columns. These later safety devices share a common assumption, to wit: that in a front-end collision, a passenger's safety will be maximized if he is fully restrained rearward and/or downward against a fixed seat.

This assumption is not necessarily valid. It has been recently recognized, for example, that an improperly deployed air bag can injure or kill a passenger, even though properly restrained, through its own artificial secondary collision. U.S. Pat. Nos. 5,125,472 issued Jun. 30, 1992; 5,398,185 issued Mar. 14, 1995; 5,413,378 issued May 9, 1995; 5,439,249 issued Aug. 8, 1995; and 5,573,269 issued Nov. 12, 1996 are all directed to protecting passengers from improper contact with inflated air bags.

A broad range of schemes have been proposed, and patented, which are intended to protect passengers from secondary collisions by the virtually-instantaneous rotation and/or translation of a portion or all of a passenger's seat at the onset of a head-on collision. However, many of the proposed devices have serious shortcomings which can prevent their achieving the desired ends, especially devices which rely on mechanical or hydraulic linkages and springs for sensing a collision and for moving the seat and which therefore can be too slow in responding.

U.S. Pat. No. 3,832,000 issued Aug. 27, 1974 discloses apparatus for rotating a passenger's seat rearward and downward in response to a cable actuated by a mechanical trigger mechanism extending forward of a vehicle's front bumper. The response time of the disclosed apparatus can be longer than optimum because of dependence on a plurality of levers in the trigger, and the fact that the seat is actuated by springs. It also appears that the device could be set off inadvertently by a low-speed bumper collision, as might occur during parallel parking.

U.S. Pat. No. 3,858,930 issued Jan. 7, 1975 discloses apparatus for translating a passenger's seat forward and and then tilting it upward in response to a hydraulic signal from a mechanical sensor in the vehicle's front bumper. Translating the passenger in the direction of travel of the vehicle adds to the forward momentum of the passenger and would seem to be the wrong direction. The translating mechanism uses an explosive charge to move the seat. The charge is contained in, and ignited by, an modified 30—30 caliber rifle cartridge, and the response time of the device is limited by the mechanical and chemical reaction times required to fire a center-fire shell, and by the limited thrust potential of such a shell.

U.S. Pat. No. 3,992,046 issued Nov. 16, 1976 discloses apparatus for translating a passenger's seat rearward in response to transfer of hydraulic fluid from a hydraulic transducer in the vehicle's front bumper to a hydraulic cylinder coupled to the seat. Although this apparatus is intended to displace a passenger in the correct direction specifically to control the deceleration progress of the passenger, response of the system can be limited by the hysteresis in displacing a considerable volume of hydraulic fluid through small-bore tubing and orifices.

U.S. Pat. Nos. 5,167,421 issued Dec. 1, 1992, and 5,344,204, issued Sep. 6, 1994 disclose apparatus for translating a passenger's seat rearward in response to an electrical signal from a normally-open momentum switch. Response of this device may be relatively slow because of the delay time required to close the switch, and may be inadequate to accelerate a passenger rapidly enough because the seat is actuated only by compression springs.

It has been discovered in accordance with the invention that a need exists for a system for very early sensing of a vehicle front-end collision, very rapid transmission of an actuating signal to the vicinity of a rearwardly- and/or upwardly translatable passenger seat, and very rapid response of a very powerful apparatus attached to the passenger seat to thrust the seat and its harnessed passenger immediately rearward and/or upward, as by executing combined translation and rotation.

It is a principal object of the invention to provide an improved system (method and apparatus) for protecting a passenger in a vehicle subject to a front-end collision by distributing the deceleration of the passenger relative to the vehicle over a relatively long period of time.

It is a further object of the invention to provide an improved system for enhancing the safety of vehicle passengers including apparatus for sensing a front-end collision of a vehicle wherein a signal representing such collision is transmitted to an actuator in a very short period of time after sensing occurs.

It is a still further object of the invention to provide an improved system for enhancing the safety of vehicle passengers wherein a passenger seat occupied by a passenger in a vehicle is displaced rearwardly in a period of time prior to the deceleration of the passenger due to a primary front-end collision of the vehicle.

Briefly described, a system in accordance with the invention senses the onset of a front-end collision through an electrical sensor mounted at the extreme front end of the vehicle, as in the front bumper thereof. When a collision is sensed, an electrical signal is sent to the passenger compartment, arriving before the deceleration pulse generated by the crash, which pulse is a shock wave transmitted through the body of the vehicle. Preferably, the sensor is a normally-closed momentum-activatable switch, the opening of which sends a negative signal (loss of electrical continuity). Circuitry connected to the vehicle battery converts the negative signal to a positive signal.

A passenger seat is equipped for virtually instantaneous rearward motion and/or rearward rotation in response to the positive signal. A passenger sitting in the seat is firmly restrained therein by a harness attached to the seat itself, consisting preferably of a lap belt and at least one shoulder belt, so that translation and/or rotation of the seat will simultaneously translate and/or rotate the harnessed passenger backwards.

The seat has a frame which may be disposed for rearward translation on captive slides or rollers, the frame normally being held in place by a catch or shearable pin. Beneath the seat, and disposed for action rearwards between a forward thrust stop attached to the floor of the vehicle and the frame of the seat, is a first linear actuator powered by an explosive charge stored therein, which charge may be ignited electrically by circuitry in response to the aforementioned positive signal. The seat is also provided with means for releasing the seat translating means, preferably a guillotine edge disposed in contact with the latch or shear pin for cutting the seat frame loose upon activation of the first actuator.

The seat back and cushion may also be hinged for rotation on the translatable frame backwards and away from the dashboard and steering wheel of the vehicle, and may be equipped with a second such actuator for causing such rotation about the hinge substantially coincident with the linear translation of the frame.

When the first actuator is ignited, the seat and its seated passenger are thrust rapidly rearward so that the passenger is travelling rearward with respect to the vehicle and more slowly forward with respect to the ground when the crash pulse arrives in the passenger compartment. Thus, the forward kinetic energy of the passenger and the intensity of his deceleration from the crash pulse is reduced. Simultaneous retro-rotation of the seat by the second actuator can orient the passenger more favorably to withstand the remaining shock of the crash pulse.

The foregoing and other objects, features, and advantages of the invention, as well as presently preferred embodiments thereof, will become more apparent from a reading of the following description in connection with the accompanying drawings in which.

Figure 7:
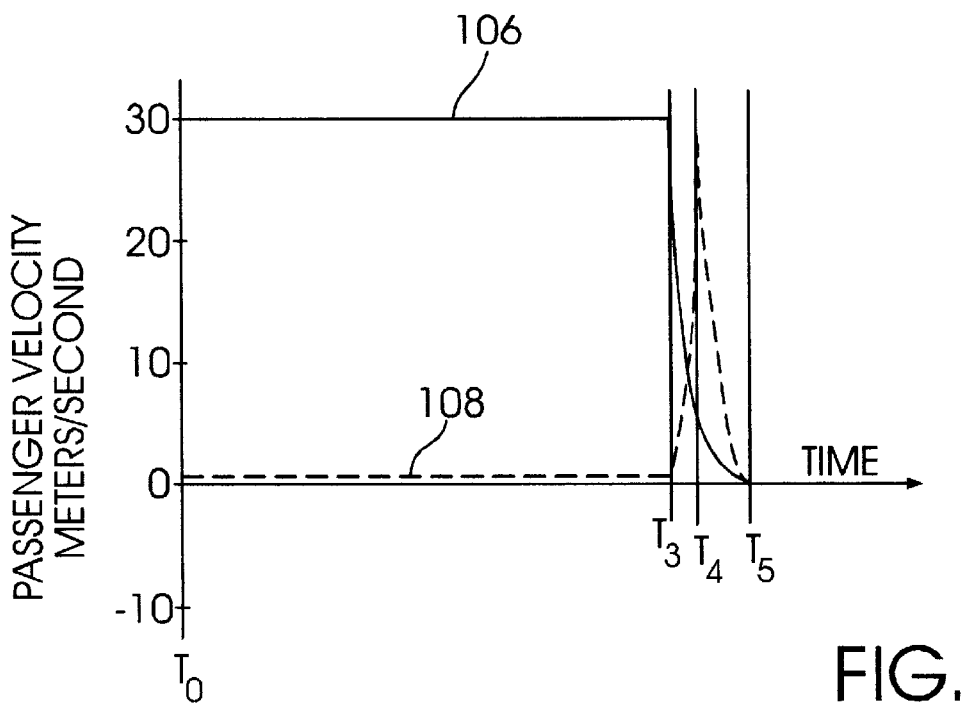
FIG. 7 is a graph of the results of Example 1, showing a passenger's velocity with time during a front-end collision of a vehicle not equipped in accordance with the subject invention, velocity being shown both with respect to the ground and with respect to the vehicle.
Figure 8:
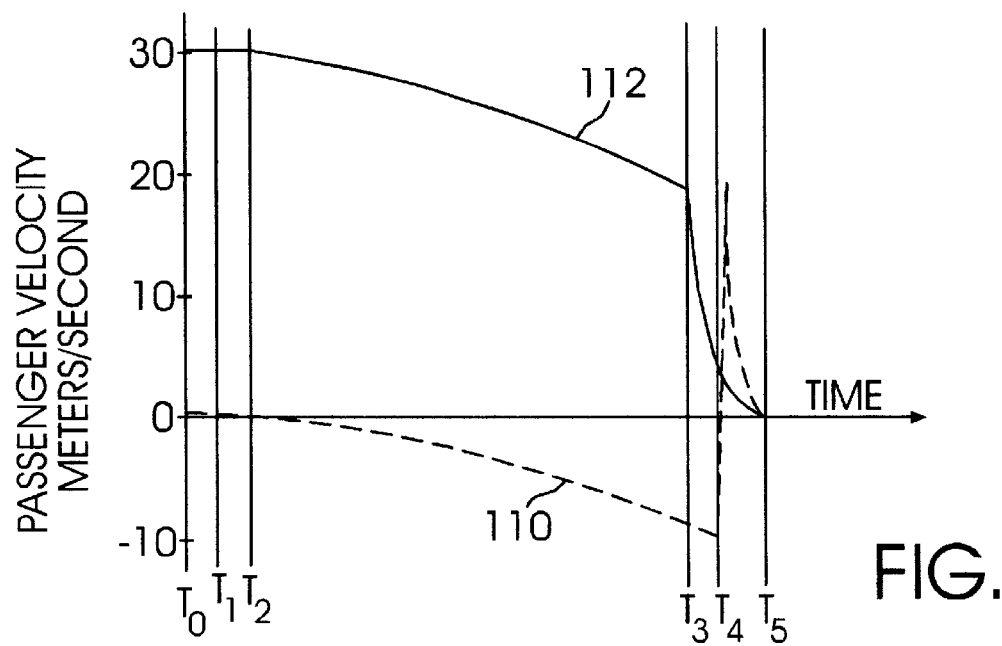
Figure 9:
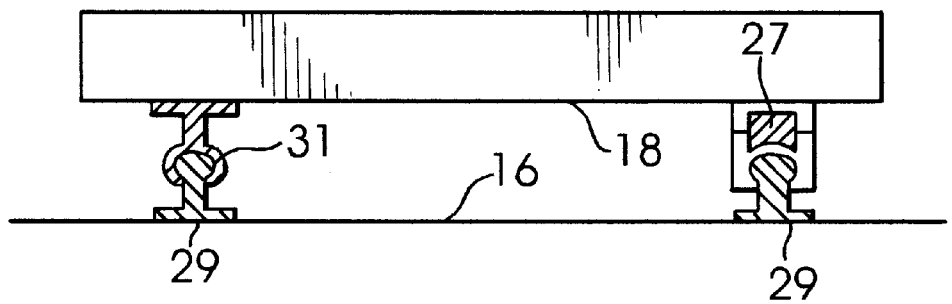
Figure 10:
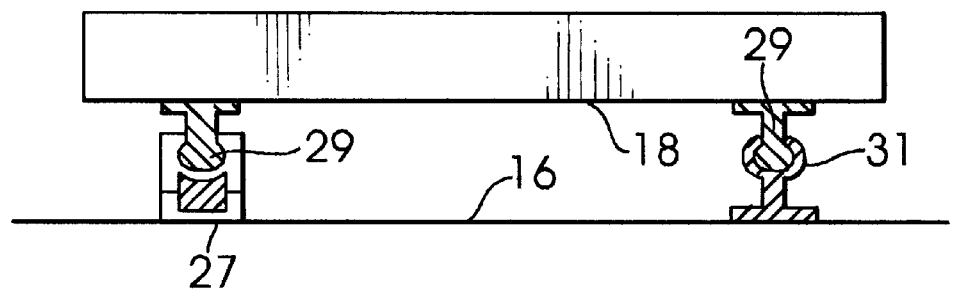

FIG. 8 is a graph of the results of Example 2, similar to FIG. 7, showing a passenger's velocity with time during a front-end collision of a vehicle equipped in accordance with the subject invention, velocity being shown both with respect to the ground and with respect to the vehicle; and FIG. 9 is a schematic elevational view of a portion of a system in accordance with the invention, showing an alternative seat translating mechanism; and FIG. 10 is a view like that shown in FIG. 9, showing another alternative seat translating mechanism.

Referring to FIGS. 1–6, there is shown a system 10 in accordance with the invention. A passenger 12 is seated in a seat 14 disposed for translation on floor 16 in the passenger compartment of a vehicle having a steering wheel 13 and a dash board 15. Seat 14 includes a frame 18, cushion portion 20, and back portion 22, the relationship and angle between cushion 20 and back 22 preferably being fixed. Frame 18 is supported by a plate 24 disposed, in the embodiment provided, for rearward translation on rollers 26 which are rollable on floor 16. Other well-known mechanisms may be used to provide for translation of the seat, for example, as shown in FIGS. 9 and 10, wheels 27 and rails 29 may be provided on either the seat frame or the floor, or guides and captive slides 31, or rollers, or other such mechanisms. Important requisites of the selected means of translation are that it have low inertia and low friction.

Passenger 12 is firmly restrained in seat 14 via a lap belt 28 and a shoulder harness 30, both of which are secured solely to the seat and not otherwise to the vehicle itself, so that movement of the seat will cause substantially identical movement of the restrained passenger. Preferably, both belt 28 and harness 30 are adjustable in length to accommodate different passengers but are fixed in length when adjusted and are not wound at a free end on centrifugal-clutch arresters such as are well known in many vehicles. Such arresters permit, and indeed require for operation, an undesirable amount of relative motion of the passenger with respect to the motion of the seat in order to activate the clutch.

Figure 3:
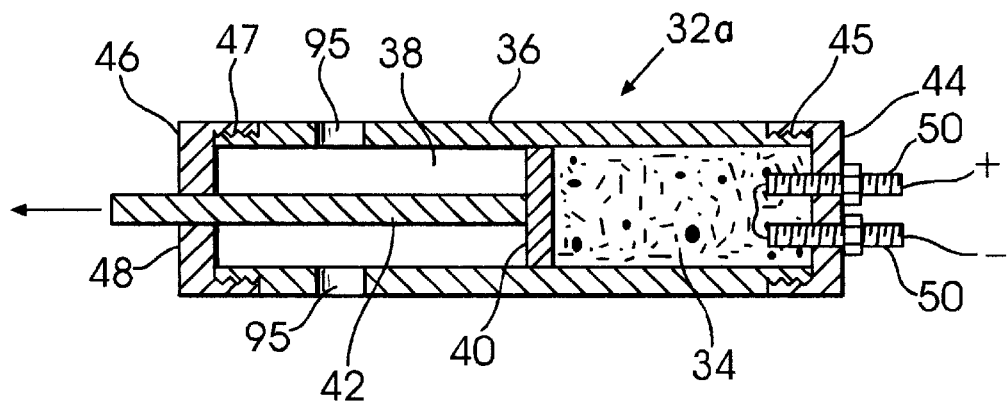
FIG. 3 is a cross-sectional view of a first embodiment of an explosive-powered actuator.
Figure 4:
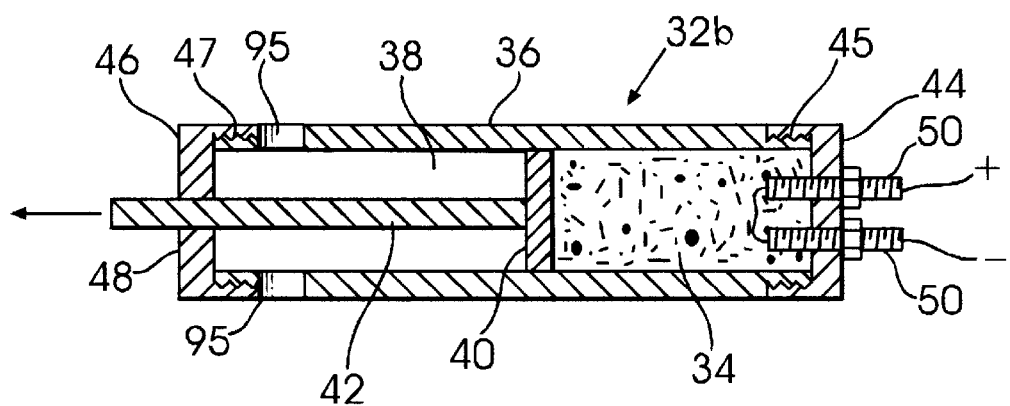
FIG. 4 is a cross-sectional view of a second embodiment of an explosive-powered actuator.

In a tunnel within cushion 20 is disposed a linear actuator 32, two different embodiments 32a and 32b of which are shown in FIGS. 3 and 4, respectively. Actuator 32 employs the explosion of a charge 34 of an explodable chemical compound or mixture of compounds stored within the actuator. Preferably, the explodable compound or mixture includes gunpowder and cellulose nitrate. A tubular case 36 has an axial bore 38 containing a piston 40 and an attached piston rod 42. Piston 40 is slidably and sealably disposed against the wall of bore 38. Case 36 is closed at a first end thereof by a first end cap 44, as by threading 45, and at a second end thereof by a second end cap 46, also as by threading 47. Cap 46 is provided with a bore 48 for admitting and guiding rod 42. Cap 44 is provided with first and second electrodes 50 for connection in series with circuitry of the invention to transmit current.

Actuator 32a is intended for use in a high voltage actuator ignition system and generates a spark between electrodes 50 within the actuator in contact with charge 34. Actuator 32b is intended for use in a low voltage ignition system and employs a fusible link 52 between electrodes 50 to ignite charge 34.

Within cushion 20, first end cap 44 is disposed against a first thrust plate 54, and the distal end of rod 42 is disposed against a second thrust plate 56. Plate 54 is firmly secured to vehicle floor 16 as by welding, and plate 56 is firmly secured to seat frame 18. Frame 18 may be provided with a bumper 58, and translation of seat 14 may be limited by a dash pot 60 mounted in a bracket 62 attached to floor 16.

Figure 6:
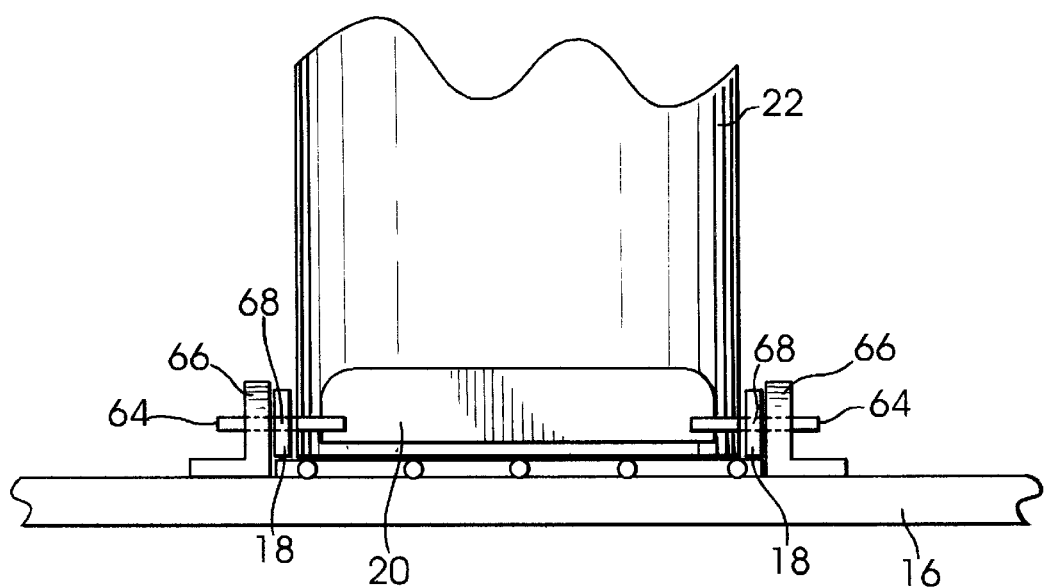
FIG. 6 is a cross-sectional view of the seat latching and release mechanism taken along line 6—6 in FIG. 1.

During normal vehicle use, seat 14 is fixed and prevented from movement by a catch. Since the time required to unlatch a catch should be minimized a preferred rapid-action catch includes a pin 64 extending through a bracket 66 attached to floor 16 and received by a opening 68 in seat frame 18. Preferably, seat 14 is so restrained on both sides, as shown in FIG. 6. Opening 68 is provided with a sharp edge for shearing pin 64 at the onset of translation of seat 14 in response to firing of actuator 32, permitting virtually instantaneous translation of seat 14 from its previously locked position.

Figure 5:
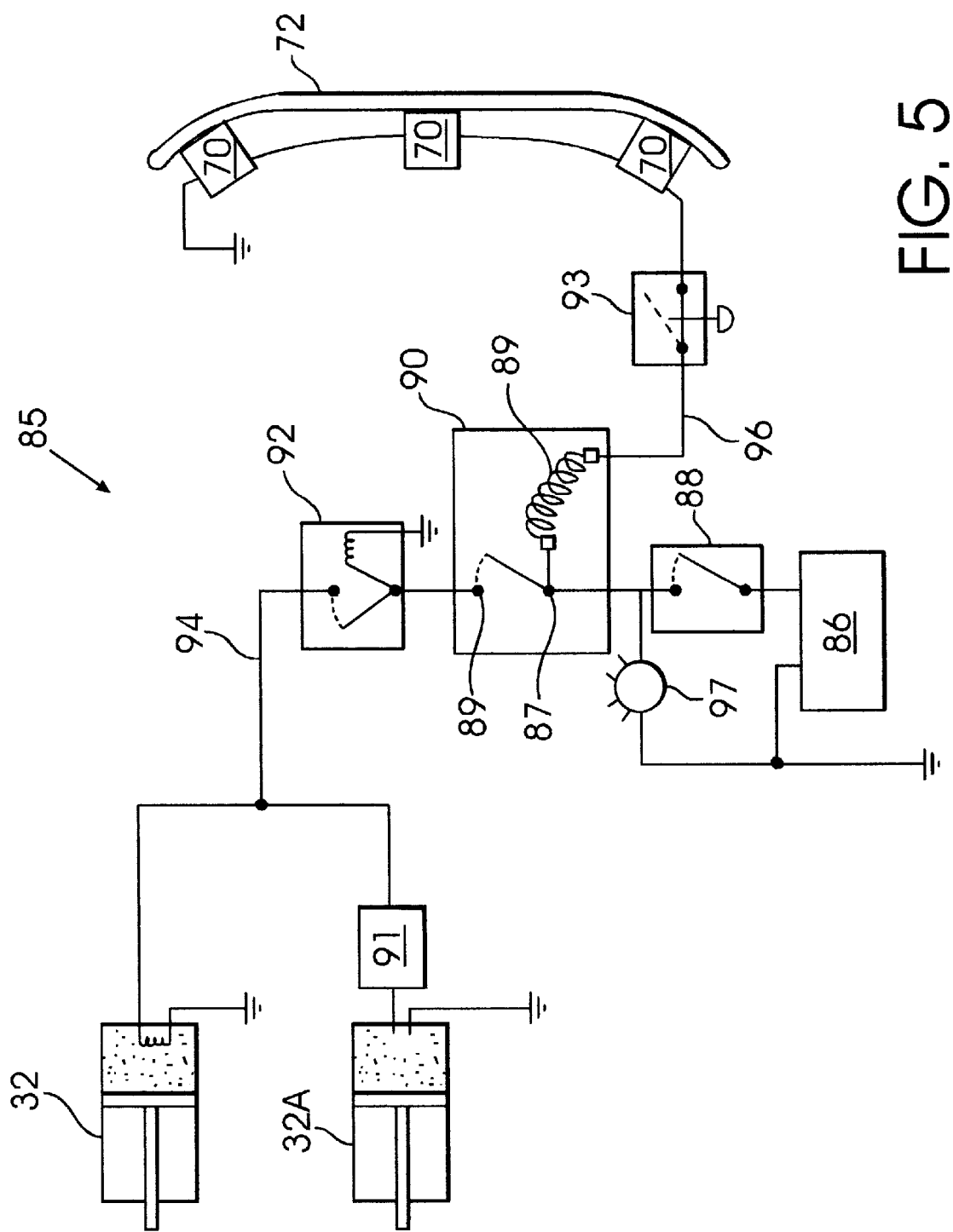
FIG. 5 is a diagram of an electrical control circuit in accordance with the invention.

A vehicle equipped in accordance with the present invention is provided with at least one momentum-actuable electric switch 70, disposed preferably in an extreme forward position of the vehicle, for example, within the front bumper 72 thereof, as shown in FIG. 5. Such forward mounting of the switch maximizes the distance between switch 70 and passenger 12 and therefore maximizes the time interval between the onset of a front-end collision and the arrival of the crash pulse at the passenger. It is preferably during this time interval that the system of the invention is operable to accelerate the passenger rearward of the vehicle to reduce the forward velocity of the passenger before the crash pulse arrives at the passenger.

Figure 2:
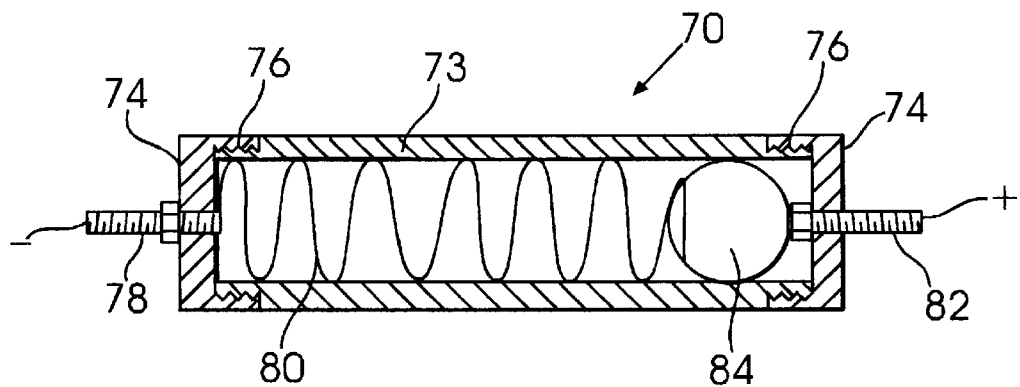
FIG. 2 is a cross-sectional view of a momentum-actuable electric switch.

Switch 70 is preferably a normally-closed switch. This is an important aspect of the present invention. A normally-open switch can impose a substantial time delay to close to send a signal indicative of the onset of a collision, which delay reduces the time available for operation of the actuator; therefore, a normally-closed switch is preferable. Such a switch is shown in FIG. 2. A non-conductive shell or case 73, preferably cylindrical, is provided with an end cap 74 at each end, secured as by threading 76. Other closures, such as an injection molded integral cap and shell, may also be acceptable. Terminal 78 extends through one of the end caps 74 to make contact with conductive coil spring 80 disposed within case 73. Terminal 82 extends through the other of the end caps 74 to make contact with a conductive element 84 within case 73. Element 84 is preferably a metal ball which is urged against terminal 82 by spring 80 to complete electrical continuity between the terminals. In response to changes in momentum, as can occur in a vehicle collision, ball 84 can be forced away from terminal 82, temporarily overcoming the urging force of spring 80 and opening the circuit between terminals 78 and 82. The extent of penetration of either or both of terminals 78 and 82 may be adjusted to vary the urging force exerted by the spring, thereby varying the decelerative force required to open the switch. Because the circuit is opened as soon as the ball begins to move to compress the spring, this switch can respond to the onset of a collision substantially faster than a normally-open switch.

A suitable circuit 85 in accordance with the present invention is shown in FIG. 5. A battery 86, preferably the vehicle starting battery, is connected through the vehicle ignition:switch 88 and through an actuating coil 89 connected to a first terminal 87 of a normally-closed relay 90 and through a first circuit 96 to a plurality of series-connected grounded momentum-sensing switches 70 mounted in vehicle front bumper 72. An override switch 93 may be inserted in circuit 96 to permit a passenger to open circuit 96 manually. Second terminal 89 of relay 90 is connected in series through a normally open relay 92 having a closing delay of, preferably, about 3 milliseconds, in a second circuit 94 from relay 90 to a linear actuator 32 or 32a disposed within a passenger seat as described above. When high-voltage actuator 32a is used, a DC voltage booster 91, for example, a DC to DC Converter available as catalogue no. 62-5010 from Tandy Corp., Ft. Worth, Tex. USA, may be included in second circuit 94. It should be understood that, while actuator 32 and actuator 32a are shown together in FIG. 5, this is only to illustrate the circuitry preferred for each type of actuator. Normally, the actuators would be used in the alternative, not together.

Since relay 90 is normally closed, normally-open delay relay 92, which may include an RC circuit, is included in second circuit 94 to prevent an electric pulse from undesirably reaching the actuator at the moment ignition switch 88 is closed.

To prepare the system for operation, when the ignition switch is closed, a current is passed through coil 89 of normally-closed relay 90, which is held in the open position shown in FIG. 5, and through first circuit 96 to momentum switches 70. A green status light 97 indicates the system is properly powered and ready for operation.

In response to a front-end collision of the vehicle, when the current through any one of series switches 70 in first circuit 96 is interrupted, relay 90 immediately closes to provide current to close delay relay 92 and thence through second circuit 94 to cause ignition of charge 34 in actuator 32 by electrodes 50. The force exerted by actuator 32 on seat frame 18 shears pin 64 and propels seat 14 and passenger 12 rearward of the vehicle so that their forward velocity, momentum, and kinetic energy are reduced prior to arrival of the crash pulse at the passenger. At the extreme of the stroke of piston 40 in actuator 32, vent ports 95 through the case 36 of the actuator are uncovered, allowing relief of the explosive pressure from within the actuator.

Alternatively, passenger 12, anticipating an imminent collision, may elect to fire the actuator by pressing override button switch 93 before the vehicle contact occurs and before sensors 70 can respond.

Figure 1:
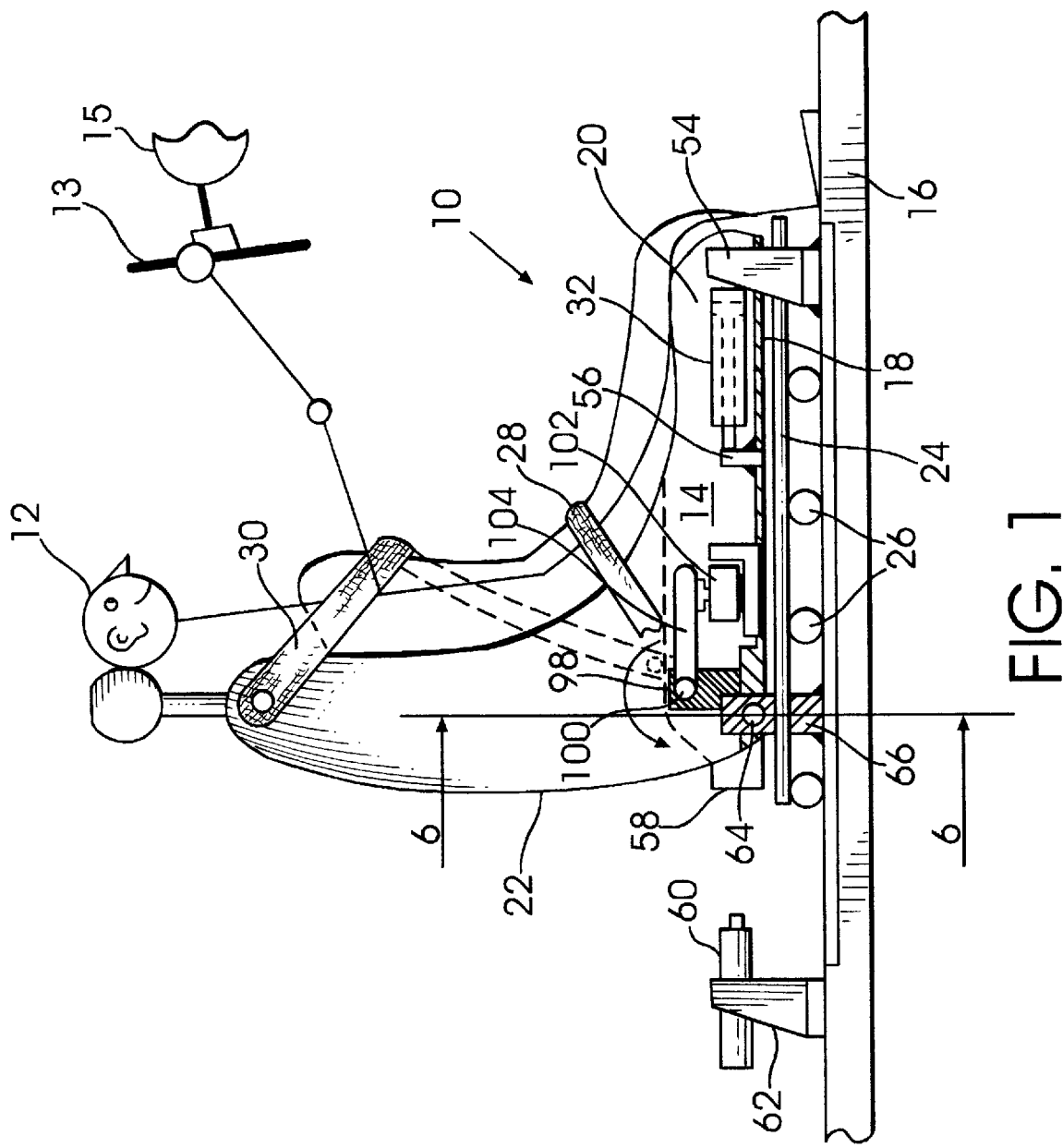
FIG. 1 is a schematic elevational view of a portion of a system in accordance with the invention, showing the principal components within the passenger compartment of a vehicle.

In some applications, it may be desirable to also rotate the passenger backwards toward a more supine position. As shown in FIG. 1, the seat may be further provided with a hinge, including a hinge bracket 98 mounted on seat frame 18 and a hinge pin 100, to permit the seat cushion and seat back assembly to rotate backwards, away from the steering wheel. A second actuator 102, similar to actuator 32 and connected in parallel therewith, is mounted on frame 18 and is disposed for actuation against lever 104 fixedly connected to the cushion/back assembly. When second circuit 94 is energized, actuators 32 and 102 cooperate to simultaneously translate and rotate the passenger rearward and away from the front end of the vehicle.

The benefit provided to a passenger by a system in accordance with the present invention is apparent in a comparison of the following two examples.

Example 1 (results shown graphically in FIG. 7): A passenger having a mass of 100 Kg (220 lbs) is seated in a vehicle not equipped in accordance with the present invention. Initially, the vehicle and passenger are travelling forward at a speed of 30 meters/sec (67 mph) (solid line 106 in FIG. 7). Relative to the ground, the passenger has total kinetic energy of $$1/2 \, mv^2 = .5 \times 10^5 \, g \times (3 \times 10^3 \, cm/sec)^2 = \quad \text{(Eq. 1)}$$
$$4.5 \times 10^{11} \, ergs = 4.5 \times 10^4 \, joules = 45 \, kilojoules \, (KJ)$$

Relative to the vehicle, the passenger has no velocity (dashed line 108 in FIG. 7) and therefore no kinetic energy.

At time=0 (time $T_0$), the vehicle undergoes a front-end collision with an object of substantial mass, such as a second vehicle travelling in the opposite direction, and decelerates rapidly to zero velocity (time $T_4$). Relative to the stopped vehicle, the passenger is relatively accelerated to 30 m/sec between $T_3$ and $T_4$ and then also decelerates to zero velocity (time $T_5$), giving up 45 KJ of energy to the vehicle in collision with some portion thereof. If the passenger is securely restrained by a harness attached to the vehicle, the energy is given up to the harness in the form of heat. Because the passenger is still travelling forward relative to the ground at 30 m/sec when the decelerative crash pulse arrives at the passenger (time $T_3$), the entire amount of kinetic energy is given up during the passage of the crash pulse through the passenger compartment, and the passenger's anatomy may be exposed to decelerations exceeding 5 G between $T_3$ and $T_5$.

Example 2 (results shown graphically in FIG. 8): Same conditions as in Example 1, except that the vehicle is equipped in accordance with the present invention. At the onset of the collision (time $T_0$), an electrical pulse from a sensor in the front bumper is transformed nearly instantaneously (time $T_1$) into ignition (time $T_2$) of an explosive actuator connected to the passenger's seat. The seat and its harnessed passenger (dashed line 110 in FIG. 8) are accelerated rapidly rearward of the vehicle and may have attained a rearward (negative) velocity with respect to the vehicle of 10 meters/sec, and kinetic energy relative to the vehicle of 5 KJ, when the decelerative pulse arrives (time $T_3$). The passenger's forward velocity with respect to the ground (solid line 112 in FIG. 8) would then be only 20 meters/sec (45 mph). When the vehicle is fully stopped (time $T_4$), the passenger and seat continue to be urged forward of the vehicle by momentum for a period of time ($T_4$ to $T_5$) to rest against a stop, and the passenger's remaining kinetic energy is given up to the harness. At 20 m/sec, the passenger's kinetic energy is now only 2 KJ, a reduction of more than 50% over that in Example 1. As a result, the passenger may be exposed to fewer than 3 G from the crash pulse. Because kinetic energy is a function of the square of the velocity, a relatively small input of energy to the passenger in the rearward direction (5 KJ) if properly timed can have a relatively large effect in reducing the passenger's forward kinetic energy (45 KJ reduced to 20 KJ). In effect, the overall deceleration has been divided into two smaller decelerations: the first ($T_2$ to $T_3$) being caused by apparatus of the invention, from 30 m/sec to 20 m/sec; and the second ($T_3$ to $T_5$) being caused by the collision, from 20 m/sec to 0 m/sec.

From the foregoing description it will be apparent that there has been provided an improved system for passenger safety, wherein the kinetic energy of a vehicle passenger may be substantially reduced before the passenger is exposed to the crash deceleration pulse. Variations and modifications of the herein described system, in accordance with the invention, will undoubtedly suggest themselves to those skilled in this art. Accordingly, the foregoing description should be taken as illustrative and not in a limiting sense.

What is claimed is:

1. A system for enhancing the safety of a passenger secured to a rearwardly-displaceable seat in a vehicle during a front-end collision of the vehicle, comprising:
   a) an actuator connected in rearward motivating displacement relationship between said passenger seat and said vehicle, said actuator having an explodable charge therein which operates said actuator;
   b) an electrical sensor mounted on said vehicle for sensing the onset of said front-end collision and for transmitting an electrical signal indicative thereof to said actuator; and
   c) an electrical igniter in said actuator responsive to said electrical signal for igniting said explodable charge within said actuator to rapidly displace said seat and said secured passenger rearwardly of said vehicle.

2. A system for enhancing the safety of a passenger in a vehicle during a front-end collision of the vehicle, comprising:
   a) a seat for a passenger, said seat being mounted on translating means attached to said seat and to said vehicle, said seat being displaceable rearwardly within said vehicle;
   b) a restraining harness attached to said seat for securing said passenger to said seat during an actuation cycle of said system;
   c) a linear actuator for displacing said seat and said secured passenger rearwardly within said vehicle, said actuator being attached to a fixed element of said vehicle and to said seat, said actuator being powered by an explodable charge; and
   d) an electrical circuit for sensing the onset of said front-end collision and responsively igniting said charge in said actuator to rapidly thrust said seat and said passenger rearwardly within said vehicle.

3. A system in accordance with claim 2 wherein said electrical circuit comprises:
   a) a source of electric power within said vehicle for powering said system;
   b) an electrical switch connected in series to said power source, said switch being normally closed to close said circuit and being openable during said collision by momentum-induced motion of a movable contact element within said switch to open said circuit; and
   c) an electrical relay switch biased to a first position thereof when said momentum-openable electrical switch is closed, and biased to a second position thereof when said momentum-openable electrical switch is opened.

4. A system in accordance with claim 3 wherein said ignition means is connected through said second position of said relay switch to said power source.

5. A system in accordance with claim 2 wherein said translating means includes at least one rail attached to said vehicle and at least one slide attached to said seat for sliding on said rail.

6. A system in accordance with claim 2 wherein said translating means includes at least one rail attached to said vehicle and at least one rotatable wheel attached to said seat for rolling on said rail.

7. A system in accordance with claim 2 wherein said translating means includes at least one slide attached to said vehicle and at least one rail attached to said seat for sliding on said slide.

8. A system in accordance with claim 2 wherein said translating means includes at least one wheel rotatably attached to said vehicle and at least one rail attached to said seat for rolling on said wheel.

9. A system in accordance with claim 2 wherein said passenger seat includes a generally horizontal cushion for sustaining the weight of said passenger and a generally vertical back for supporting the upper torso and of said passenger against decelerative and accelerative thrusts exerted upon said passenger by said collision and by activation of said system, respectively.

10. A system in accordance with claim 2 wherein said harness includes a belt fastenable across the lap of said passenger.

11. A system in accordance with claim 10 wherein said harness further comprises at least one belt fastenable across the upper torso of said passenger.

12. A system in accordance with claim 9 wherein said passenger seat includes a frame rearwardly actuable by said actuator, and wherein said cushion and said back are mutually connected to define an assembly, and further comprising a hinge transverse of said vehicle connecting said assembly to said frame, and further comprising a second linear actuator powered by at least one explodable compound disposed between said seat frame and seat cushion/back assembly for rotating said assembly about said hinge in response to an electrical signal to said second actuator.

13. A system in accordance with claim 2 wherein said electric power source is a battery.

14. A system in accordance with claim 13 further comprising a voltage booster in a further circuit for increasing the voltage output of said power source.

15. A system in accordance with claim 2 wherein said electrical switch is disposed in a forward portion of said vehicle.

16. A system in accordance with claim 15 wherein said electrical switch is disposed in a front bumper of said vehicle.

17. A system in accordance with claim 2 wherein said electrical ignition means includes a pair of electrodes having a gap therebetween for generating an electric spark when a voltage is imposed across said electrodes.

18. A method for enhancing the safety of a passenger in a vehicle during a front-end collision of the vehicle, the passenger being secured to a rearwardly-displaceable seat having a seat back and seat cushion disposed on a seat frame in a passenger compartment in the vehicle and being subject to an intense decelerative pulse transmitted in a finite period of time from the front of the vehicle to the passenger compartment, comprising the steps of:

a) providing an electrically-ignitable explosive-powered actuator operable rearwardly within said vehicle and disposed between said vehicle and a frame of said displaceable seat;

b) providing a momentum-activatable electric switch in a forward area of said vehicle, said switch being connected in an electric circuit including a source of electric power and said electrically-ignitable actuator;

c) sensing the onset of a front-end collision through actuation of said momentum-activatable switch;

d) providing an electrical signal indicative of said accident onset from said switch to said actuator; and e) igniting said actuator in response to said signal to begin displacing said seat frame and said seated passenger rearwardly within said vehicle, said steps c, d, and e being completed during said finite period of time.

19. A method in accordance with claim 18 further comprising the steps of:

a) hingeably connecting said seat back and seat cushion to said seat frame;

b) providing a second electrically-ignitable explosive-powered actuator disposed between said seat cushion and said seat frame;

c) providing said electrical signal indicative of said accident onset to said second actuator; and d) igniting said second actuator in response to said signal to begin rotating said seat and said passenger about said hinge, said further steps c and d being completed during said finite period of time.

20. A system according to claim 3 wherein said switch is a normally closed electrical switch comprising a generally cylindrical non-conductive shell; first and second end caps disposed on opposite ends of said shell, respectively, each end cap having a conductive terminal communicating electrically between the interior and exterior of said switch; said moveable conductive element being disposed within said shell; and a conductive spring disposed in compression within said shell between said movable element and a first of said terminals and urging said moveable element against the second of said terminals to complete conductive continuity therebetween when the spring constant is greater than the momentum of said moveable element in the direction of said spring and allowing said moveable element to break conductive continuity with said second terminal when the momentum of said movable element in the direction of said spring exceeds said spring constant.

21. A system according to claim 2 wherein said linear actuator comprises a case having a first bore therein, said case being disposable adjacent said seat at first object; a piston slidably disposed within said first bore; a first end cap closing a first end of said first bore; a second end cap closing a second end of first bore and having a second bore therethrough; a rod connected at a first end thereof to said piston and extending to said second bore, a second end of said rod being disposable adjacent to said seat, said charge being of at least one explodable compound disposed within said first bore between said first end cap and said piston; said electrical circuit including electrical ignition means disposed in contact with said charge and communicating with the exterior of said actuator to ignite said explodable compound upon imposition of an electrical signal to said ignition means to rapidly displace said piston and said rod linerally away from said first end cap and thereby to displace said seat in said direction rearwardly of the direction of travel of said vehicle.

\* \* \* \* \*